(12) United States Patent
Wakizaka et al.

(10) Patent No.: US 9,202,631 B2
(45) Date of Patent: Dec. 1, 2015

(54) POROUS FILM AND SECONDARY BATTERY ELECTRODE

(75) Inventors: Yasuhiro Wakizaka, Kanagawaken (JP); Mayumi Fukumine, Kanagawa-ken (JP)

(73) Assignee: ZEON CORPORATION, Tokyo (JP)

( * ) Notice: Subject to any disclaimer, the term of this patent is extended or adjusted under 35 U.S.C. 154(b) by 633 days.

(21) Appl. No.: 12/935,437

(22) PCT Filed: Mar. 31, 2009

(86) PCT No.: PCT/JP2009/056606
§ 371 (c)(1),
(2), (4) Date: Dec. 29, 2010

(87) PCT Pub. No.: WO2009/123168
PCT Pub. Date: Oct. 8, 2009

(65) Prior Publication Data
US 2011/0091774 A1    Apr. 21, 2011

(30) Foreign Application Priority Data
Mar. 31, 2008    (JP) ................................ 2008-094153

(51) Int. Cl.
*H01M 2/16* (2006.01)
*H01M 10/0525* (2010.01)
*H01G 9/02* (2006.01)
*H01G 11/38* (2013.01)
*C08J 5/18* (2006.01)

(52) U.S. Cl.
CPC ... *H01G 9/02* (2013.01); *C08J 5/18* (2013.01); *H01G 11/38* (2013.01); *H01M 2/166* (2013.01); *H01M 2/168* (2013.01); *H01M 2/1646* (2013.01); *H01M 10/0525* (2013.01); *C08J 2301/02* (2013.01); *Y02E 60/122* (2013.01)

(58) Field of Classification Search
USPC .......................................... 429/144, 209, 247
See application file for complete search history.

(56) References Cited

U.S. PATENT DOCUMENTS

| | | | |
|---|---|---|---|
| 6,753,108 B1 * | 6/2004 | Hampden-Smith et al. .. | 429/406 |
| 2001/0012580 A1 * | 8/2001 | Reichert et al. ............... | 429/137 |
| 2003/0124430 A1 * | 7/2003 | Takizawa et al. ............. | 429/300 |
| 2005/0106468 A1 * | 5/2005 | Deiters et al. ................. | 429/254 |
| 2005/0170258 A1 * | 8/2005 | Kawakami ..................... | 429/330 |
| 2006/0106468 A1 * | 5/2006 | Kim ................................. | 700/19 |
| 2006/0188785 A1 | 8/2006 | Inoue et al. | |
| 2006/0257739 A1 * | 11/2006 | Ryu et al. ...................... | 429/217 |
| 2006/0269842 A1 | 11/2006 | Ichinose et al. | |
| 2006/0275661 A1 * | 12/2006 | Kim et al. ...................... | 429/217 |
| 2007/0196737 A1 | 8/2007 | Ohata et al. | |
| 2008/0292968 A1 | 11/2008 | Lee et al. | |
| 2009/0111026 A1 | 4/2009 | Kim et al. | |
| 2009/0136848 A1 | 5/2009 | Minami et al. | |

FOREIGN PATENT DOCUMENTS

| | | | |
|---|---|---|---|
| EP | 1355369 A1 * | 10/2003 | |
| JP | 9-147916 A | 6/1997 | |
| JP | 11067213 A * | 3/1999 | |
| JP | 2006066400 A * | 3/2006 | |
| JP | 2007-280911 A | 10/2007 | |
| KR | 10-0727248 B1 | 6/2007 | |
| WO | WO 2005/011043 A1 | 2/2005 | |
| WO | WO 2005/098997 A1 | 10/2005 | |
| WO | WO 2006/062349 A1 | 6/2006 | |
| WO | WO 2007/066967 A1 | 6/2007 | |
| WO | WO 2007/108426 A1 | 9/2007 | |

OTHER PUBLICATIONS

International Search Report, dated Jul. 14, 2009 and issued in PCT/JP2009/056606.
International Preliminary Report on Patentability and English translation of the Written Opinion of the International Searching Authority dated Dec. 23, 2010 for Application No. PCT/JP2009/056606 (Forms PCT/IB/338, PCT/IB/373 and PCT/ISA/237).
Extended European Search Report for European Application No. 09728531.6 dated Jan. 2, 2013.

* cited by examiner

*Primary Examiner* — Gregg Cantelmo
(74) *Attorney, Agent, or Firm* — Birch, Stewart, Kolash & Birch, LLP

(57) ABSTRACT

Provided is a porous film that can contribute to improving the cycle characteristics of an electric cell by improving binding characteristics, for a porous film provided on a surface of an electrode used in a secondary cell and the like. The porous film comprises a water-soluble polymer, an inorganic filler, and a water-insoluble particulate polymer including 0.5-40 mass % of a monomer unit having a hydrophilic group selected from the group consisting of carboxylic acid groups, hydroxyl groups, and sulfonate groups.

18 Claims, No Drawings

POROUS FILM AND SECONDARY BATTERY ELECTRODE

TECHNICAL FIELD

The present invention relates to a porous film, more precisely, to a porous film formed on an electrode surface of a lithium ion secondary battery and an electric double layer capacitor which possibly contributes to improve film uniformity, flexibility and cyclic property for a battery. Also, the present invention relates to a secondary battery electrode provided with said porous film.

BACKGROUND ART

In a practically applied battery, a lithium ion secondary battery has a highest energy density and has been widely used for, in particularly, small sized electronic devices. Also, in addition to a small sized usage, it has been prospected for expanding usage for vehicles. In this matter, it has been desired long term durability and more improvement of safety for a lithium ion secondary battery.

A lithium ion secondary battery normally comprises a positive electrode and a negative electrode including electrode composite material layer supported on a collector, a separator and a nonaqueous electrolyte. The electrode composite material layer comprises an electrode active material having about 5 to 50 μm of an average particle size and a binder. The electrodes are produced by forming an electrode composite material layer by coating mixture material slurry including a powdery electrode active material on the collector. Also, as for the separator for separating the positive and negative electrodes, a very thin separator having about 10 to 50 μm thickness is used. The lithium ion secondary battery is produced stacking the electrodes and the separator, and cutting them to be a predetermined electrode shape and the like. However, during this continuing producing process, the active material sometimes disengages from the electrode composite material layer and apart of the disengaged active material is included in the battery as a contamination.

The contamination like this has 5 to 50 μm of particle diameter which is about same level of the thickness of the separator, and the contamination penetrates the separator in the battery which causes a problem including short circuit. Also, heat is generated when the battery operating. As a result, a separator composed of a stretched polyethylene and the like are also heated. The separator composed of the stretched polyethylene and the like tends to shrink even though at a temperature of 150° C. or less in general, which could easily to induce a short circuit of the battery. Also, when a projection having sharp shape like a nail penetrates (for example, nail penetration tests), short circuit reaction heat is generated quickly, and a short circuit portion is enlarged.

Therefore, in order to solve such the problems, it is proposed to provide a porous protection film on a surface of the electrode. By providing the porous protection film, the disengagement of the active material at the time of producing process of the battery is prevented, and the short circuit when operating the battery is also prevented. Further, because the protection film is porous, there is no inhibition of battery reaction by penetrating an electrolyte solution in the protection film.

For example, in Patent Document 1, a porous protection film formed by using fine particle slurry including polyvinylidene fluoride as a binder and a fine particle such as alumina, silica, polyethylene resin and the like is disclosed. In Patent Document 2, a porous protection film composed thermal crosslinking resin such as polyacrylonitrile as for a binder is disclosed.

However, in case that polymer such as polyvinylidene fluoride and thermal crosslinking resin are used as the binder, there will be a risk to crack when winding due to poor flexibility of the porous film. Thus, it is necessary to perform electrode winding and the like with extremely slow winding speed. Further, in case that the crack is occurred when winding, there is a high possibility of firing of a battery, because disengaged agglomeration causes a short circuit.

Also, in Patent Document 3, as means for solving the above mentioned problem of flexibility, a porous protective film formed by using slurry obtained by dispersing inorganic filler in a resin binder composed of a water soluble polymer such as carboxymethyl cellulose and the like, and rubber particle composed of acrylonitrile-acrylate copolymer is disclosed. Although a significant improvement of the flexibility can be found by using the rubber particle as the binder, deterioration of the cyclic property can be found, because disengagement phenomenon (powder dropping) of a part of the porous film is occurred due to poor binding property. Further, due to insufficient dispersibility of the inorganic filler, film uniformity is poor.

Patent Document 1: Japanese Patent Laid Open No. 7-220759
Patent Document 2: Japanese Patent Laid Open No. 2005-332809
Patent Document 3: WO2005/011043

DISCLOSURE OF INVENTION

Problem to be Solved by the Invention

The present invention has been made in view the above conventional technical arts, a purpose of the invention is to provide a porous film which is formed on a surface of an electrode used for a secondary battery and the like, which has excellent binding property and is capable to contribute for improving a cyclic characteristic of the battery.

Means for Solving the Problem

In order to solve the above mentioned problem, as a result of intentional study by the present inventors, it has been found that a porous film capable to provide a battery which shows excellent cycle characteristic can be obtained by using water soluble polymer and particulate polymer including hydrophilic group, as a binder to compose a porous film, for improving excellent binding property, and the present invention has been achieved thereby.

The present invention to the above problem comprises following matters as gist.

(1) A porous film comprising;
water soluble polymer,
inorganic filler, and
water insoluble particulate polymer comprising 0.5 to 40 mass % of monomer unit including hydrophilic group selected from the group consisting of carboxylic acid group, hydroxyl group and sulfonic acid group.

(2) The porous film as set forth in (1), wherein said water soluble polymer is selected from thickening polysaccharides.

(3) The porous film as set forth in (2), wherein said thickening polysaccharides are selected from the group consisting cellulose base semisynthetic polymers, sodium salts and ammonium salts thereof.

(4) The porous film as set forth in (1), wherein hydrophilic group of said particulate polymer is carboxylic acid group.

(5) The porous film as set forth in any one of (1) to (4), wherein a content ratio of said water soluble polymer in said porous film is 0.1 to 5 parts by mass per 100 parts by mass of said inorganic filler, and a content ratio of water insoluble particulate polymer is 0.1 to 15 parts by mass per 100 parts by mass of the inorganic filler.

(6) A secondary battery electrode comprising;
an electrode composite material layer including a binder and an electrode active material,
a collector to which the electrode composite material layer is adhered, and
the porous film as set forth in (1) is provided on a surface of the electrode composite material layer.

(7) A method for manufacturing the secondary battery electrode as set forth in (6) comprising;
coating and drying slurry for porous film comprising water soluble polymer, inorganic filler, water insoluble particulate polymer including 0.5 to 40 mass % of monomer unit comprising hydrophilic group selected from the group consisting of carboxylic acid group, hydroxyl group and sulfonic acid group, and dispersion medium on an electrode composite material layer comprising a binder and an electrode active material.

(8) A lithium ion secondary battery comprising; a positive electrode, a negative electrode and an electrolyte solution wherein
at least one of the positive electrode and negative electrode is the electrode as set forth in (6).

Effects of the Invention

By the present invention, a porous film having excellent binding property which is capable to contribute for improving cycle characteristic of a battery is provided. Said porous film is formed on a surface of a secondary battery electrode and acts as a protective film for the electrode, and has high binding property for adhering to the surface of electrode, it contributes to prevent disengagement of the active material and to prevent short circuit when battery operating.

BEST MODE FOR WORKING THE INVENTION

Hereinafter, the present embodiment will be explained, precisely.

A porous film of the present embodiment comprises water soluble polymer, inorganic filler and water-insoluble particulate polymer.

(Particulate Polymer)

Particulate polymer is composed of water insoluble polymer and includes hydrophilic group selected from the group consisting of carboxylic acid group, hydroxylic group and sulfonic acid group.

The water insoluble polymer in the present specification means polymer that has insoluble content of 90 mass % or more when 0.5 g of polymer is dissolved in 100 g of water at 25° C. On the other hand, water soluble polymer means polymer that has insoluble content of 0.5 mass % or less under the same condition.

For the particulate polymer, dispersibility and adhesion property of inorganic filler can be improved by including the above mentioned hydrophilic group. Because surface of the inorganic filler has hydrophilic property and the particulate polymer comprises hydrophilic group, the particulate polymer easily adsorb to a surface of the inorganic filler. And according to high dispersibility of the inorganic filler due to the particulate polymer is easily adsorbed on the surface of the inorganic filler, it is capable to obtain high dispersibility of the inorganic filler and strength binding condition when producing an electrode. Thus, in views of improving affinity with inorganic filler, uniformly dispensing inorganic filler in the slurry, and improving binding property of the obtained porous film, it is necessary to include the hydrophilic group in the above mentioned particular polymer.

The hydrophilic group can be introduced to the particulate polymer by copolymerizing monomer including the hydrophilic group and other monomer copolymerizable therewith, when producing the particulate polymer.

As for the monomer comprising carboxylic acid group, monocarboxylic acid and its derivatives, dicarboxylic acid, its acid anhydrides and derivatives thereof can be exemplified. As for the monocarboxylic acid, acrylic acid, methacrylic acid, crotonic acid and the like can be exemplified. As for the monocarboxylic acid derivatives, 2-ethylacrylic acid, isocrotonic acid, α-acetoxyacrylic acid, β-trans-aryloxyacrylic acid, α-chloro-β-E-methoxyacryalic acid, β-diaminoacrylic acid and the like can be exemplified. As for the dicarboxylic acid, maleic acid, fumaric acid, itaconic acid and the like can be exemplified. As for the acid anhydrides of dicarboxylic acid, maleic anhydride, methylmaleic anhydride, dimethylmaleic anhydride and the like can be exemplified.

As for the dicarboxylic acid derivatives, methyl maleic acid, dimethyl maleic acid, phenyl maleic acid, chloro maleic acid, dichloro maleic acid, fluoro maleic acid methylaryl maleate, diphenyl maleate, nonyl maleate, decyl maleate, dodecyl maleate, octadecyl maleate, fluoro alkyl maleate and the like can be exemplified.

As for the monomer comprising hydrophilic group, unsaturated ethylenic alcohol such as, (meth)allyl alcohol, 3-buten-1-ol, 5-hexan-1-ol and the like; alkanol esters of unsaturated ethylenic carboxylic acid such as, acrylic acid-2-hydroxyethyl, acrylic acid-2-hydroxypropyl, methacrylic acid-2-hydroxyethyl, methacrylic acid-2 -hydroxypropyl , maleic acid-di-2-hydroxyethyl , maleic acid di-4-hydroxybutyl, itaconic acid di-2-hydroxypropyl and the like; esters of polyalkylene glycol and (meth)acrylic acid shown by a generic formula $CH_2=CR^1-COO-(C_nH_{2n}O)_m-H$ (m is integral number of 2 to 9, n is integral number of 2 to 4, $R^1$ is hydrogen or methyl group); mono(meth)acrylate esters of dihydroxy ester of dicarboxylic acid such as 2-hydroxyethyl-2'-(meth)acryloyl oxyphthalate, 2 -hydroxyethyl-2'-(meth) acryloyl oxysuccinate and the like; vinyl ethers such as 2-hydroxyethylvinylether, 2-hydroxypropylvinylether and the like; mono(meth)allyl ethers of alkylene glycol such as (meth)allyl-2-hyroxyethyl ether, (meth)aryl-2-hydroxypropyl ether, (meth)allyl-3-hydroxypropyl ether, (meth) allyl-2-hydroxybutyl ether, (meth)allyl-3-hydroxybutyl ether, (meth)allyl-4-hydroxybutyl ether, (meth)allyl-6-hydroxyhexyl ether and the like; polyoxyalkyleneglycol(meth) monoallyl ether such as, diethyleneglycol mono(meth)aryl ether, dipropylene glycolmono(meth)allyl ether and the like; mono(meth)allyl ether of halogen and hydroxy substituent of (poly)alkylene glycol such as, glycerin mono(meth)allyl ether, (meth)allyl-2-chloro-3-hydroxypropyl ether, (meth)allyl-2-hydroxy-3-chloropropyl ether and the like; mono(meth) allyl ethers of polyphenol and halogen substituted thereof such as eugenol, isoeugenol and the like; (meth)allylthio ethers of alkylene glycol such as (meth)allyl-2-hydroxyethylthio ether, (meth)allyl-2-hydroxypropylthio ether and the like are exemplified.

Also, as for the monomer comprising sulfonic acid group, vinyl sulfonic acid, methylvinyl sulfonic acid, (meth)allyl sulfonic acid, styrene sulfonic acid, (meth)acrylic acid-2- sufonic acid ethyl, 2-acrylamide-2-methylpropane sulfonic acid, 3-allyloxy-2-hydroxypropane sulfonic acid and the like are exemplified.

Note that, in the present embodiment, "(meth)acryloyl" means "acryloyl" or "methacryloyl", "(meth)allyl" means "allyl" or "methallyl", "(meth)acryl" means "acryl" or "methacryl", respectively.

In these, as for the hydrophilic group, the carboxylic acid group is preferable, in view of that dispersibility of the inorganic filler and adhesion property can be improved further. Among the carboxylic acid group, dicarboxylic acid is further preferable which can be adsorbed efficiently to the surface of the inorganic filler particle due to existing two hydrophilic groups adjacently. In particular, itaconic acid is the most preferable.

Content amount of hydrophilic group in the particulate polymer is preferably within a range of 0.5 to 40 mass %, more preferably 3 to 20 mass % as hydrophilic group containing monomer amount per 100 mass % of whole unit of monomer. The hydrophilic group containing amount in the particulate polymer can be controlled by charging rate of monomer when preparing polymer. When the amount of the hydrophilic group containing monomer is too small, the above mentioned effect cannot be obtained because amount of the hydrophilic group in the particulate polymer is small. Contrary this, when the amount of the hydrophilic group containing monomer is too large, dispersibility of the inorganic filler sometimes rather tends to deteriorate, because solubility to water becomes higher.

The particulate polymer comprising the hydrophilic group has a weight average molecular weight based on polystyrene standard by GPC of preferably within a range of 10,000 to 500,000, more preferably 20,000 to 200,000. When the weight average molecular weight of the particulate polymer is within the above mentioned range, a porous film having advantage strength in which inorganic filler is uniformly dispersed can be obtained.

Also, an average particle diameter (D50 average particle diameter of volume average) of the particulate polymer comprising the hydrophilic group is preferably 0.01 to 0.5 µm, further, 0.01 to 0.25 µm is more preferable. When the particle diameter of the particulate is too large, adhesion property may reduced because contact point with the filler are reduced. When the particle diameter is too small, there is a risk to deteriorate battery characteristics due to raising film resistance, because the porosity is lowered.

Further, a grass transition temperature (Tg) of the particulate polymer including the hydrophilic group is preferably 20° C. or below, further 5° C. or below is preferred. When the grass transition temperature (Tg) is within said range, flexing resistance of the electrode is improved so that defective fraction by cracking the porous film can be decreased, because flexibility of the porous film is improved.

The particulate polymer including the above mentioned hydrophilic group can be obtained by copolymerizing monomer including hydrophilic group and other copolymerizable monomer.

As for other copolymerizable monomer, α, β-unsaturated nitrile compound such as acrylonitrile, methacrylonitrile and the like; styrene type monomer such as styrene, chlorostyrene, vinyl toluene, t-butyl styrene, vinyl benzoic acid, methyl vinyl benzonate, vinyl naphthalene, chloromethyl styrene, α-methyl styrene, divinylbenzene and the like; olefins such as ethylene, propylene and the like; (meth)acrylic acid alkyl esters such as methyl(meth)acrylate, ethyl(meth)acrylate, butyl(meth)acrylate, hexyl(meth)acrylate, 2ethylhexyl (meth)acrylate and the like; carboxylic acid esters having two or more carbon-carbon double bonds such as ethylene glycol dimethacrylate, diethylene glycol dimethacrylate, trimethylol propane triacrylate and the like; diene type monomer such as butadiene, isopropylene and the like; halogen atoms containing monomer such as vinyl chloride, vinylidene chloride and the like; vinyl esters such as vinyl acetate, vinyl propionate, vinyl butyrate and the like; vinyl ethers such as methylvinyl ether, ethylvinyl ether, butylvinyl ether and the like; vinyl ketones such as methylvinyl ketone, ethylvinyl ketone, butylvinyl ketone, hexylvinyl ketone, isopropenylvinyl ketone and the like; heterocycle ring containing vinyl compounds such as N-vinyl pyrolidone, vinyl pyridine, vinyl imidazole and the like; amide type monomer such as acrylamide, N-methylol acrylamide, acrylamide-2-methyl propane sulfonic acid and the like can be exemplified.

Also, it is preferable that the particulate polymer contains crosslinking group. In case that the crosslinking group is introduced, the porous film can be crosslinked by heat treatment after forming the porous film, and hence a strong and soft porous film can be obtained, because dissolving and swelling to electrolyte solution can be prevented. As for the crosslinking group, although epoxy group, hydroxyl group which are hydrophilic group are included, and further N-methylol amide group, oxazoline group and the like are exemplified, the epoxy group and/or the hydroxyl group are/is preferable. Namely, the hydroxyl group has functions to disperse the filler uniformly, when dispersing the inorganic filler, and to realize function as crosslinking group when forming a film. The crosslinking group may be introduced at the time of producing the particulate polymer by copolymerizing polymerizable compound including the crosslinking group simultaneously, also, it may be introduced to the particulate polymer by commonly used modifying means using crosslinking group containing compound.

A method for producing the particulate polymer is not particularly limited, any methods such as solution polymerization method, suspension polymerization method, emulsion polymerization method can be used. As for a polymerization initiator used for polymerization, for example, organic peroxide such as lauroyl peroxide, diisopropyl peroxydicarbonate, di-2-ethylhexyl peroxydicarbonate, t-butyl peroxypivalate, 3,3,5-trimethyhexanoil peroxide and the like, azo compound such as α,α'-azobisisobutylnitrile and the like, or ammonium persulfate, potassium persulfate and the like can be exemplified.

In particular, the emulsion polymerization method and suspension polymerization method are preferable, since it is possible to polymerize in water and to be added as they are, when producing the slurry for porous film.

(Water Soluble Polymer)

An average polymerization degree of water soluble polymer used for the present embodiment which is calculated from intrinsic viscosity measured by Ubbelohde viscometer is preferably within a range of 500 to 2500, more preferably 1000 to 2000, particularly preferably 1000 to 1500.

In aqueous slurry, it is supposed that disperse stabilization of the inorganic filler is performed by existing a part of the water soluble polymer in water and adsorbing a part of the polymer on a surface of the inorganic filler. Then, the average polymerization degree of the water soluble polymer sometimes effects to adsorption stability to the inorganic filler.

For example, in case that the average polymerization degree of the water soluble polymer is smaller than said range, solubility of the water soluble polymer to water is high and mobility of the polymer becomes higher, even in case that the water soluble polymer adheres to the surface of the inorganic filler, it could easily to remove from the inorganic filler due to mobility and high solubility of the polymer. Therefore, dispersion stable layer by the water soluble polymer on the surface of the inorganic filler sparse, as a result, inorganic filler cannot be dispersed stably, and it becomes difficult to obtain an uniform film. To the contrary, in case that the average polymerization degree of the water soluble polymer is larger than above range, adsorption are made between a plurality of inorganic fillers, there sometime occur crosslinking aggregation. In addition, viscosity of the slurry is considerably increased, and the fluidity of the slurry is lowered. As a result, smoothing (leveling) of the surface of the coating film is hardly occurred in coating process, and there is a risk that the obtained electrode becomes nonuniform.

In this manner, the average polymerization degree of the water soluble polymer sometimes effects to fluidity of the slurry, a film uniformity of the obtained porous film and process of steps, it is preferable to select water soluble polymer having optimal average polymerization degree.

As for the water soluble polymer, for example, natural polymer, semisynthetic polymer and synthetic polymer can be exemplified.

When it is used in a battery, stability at high electric potential is necessary. Dispersibility of the filler is required when it is used for a porous film. Also, in view of necessity for coating on a surface of electrode or a surface of separator, the slurry is required to show fluidity having certain level of viscosity. In this manner, it is necessary to select materials from large views. In these water soluble polymers, particularly, thickening polysaccharides are preferable, in view of providing viscosity. As for the thickening polysaccharides, natural polymer and cellulose base semisynthetic polymer are included.

As for the natural polymer, for example, polysaccharides and proteins derived from plant or animal origin and the like can be exemplified, also, natural polymer treated by fermentation by micro organism and the like and heat can be exemplified, according to the circumstances. These natural polymers can be classified as plant base natural polymer, animal base natural polymer and micro organic base natural polymer.

As for the plant base natural polymer, for example, gum arabic, gum tragacanth, galactan, Guar gum, carob gum, carageenan, pectin, kannan, quince seed (marmelo), algecolloid (phaeophyceae extract), starch (originated from rice, corn, potato, wheat and the like), glycyrrhizin and the like can be exemplified. As for the animal base natural polymer, for example, collagen, casein, albumin, gelatin and the like can be exemplified. As for the micro organism base natural polymer, xanthan gum, dextran, succinoglucan, pullulan and the like are exemplified.

Cellulose base semisynthetic polymer can be classified as nonionic, anionic and cationic.

As for the nonionic cellulose base semisynthetic polymer, for example, alkylcellulose such as methylcellulose, methylethylcellulose, ethylcellulose, microcrystalline cellulose or the like, and hydroxyalkylcellulose such as hydroxyethyl cellulose, hydroxybutylmethyl cellulose, hydroxypropyl cellulose, hydroxypropylmethyl cellulose, hydroxyethylmethyl cellulose, hydroxypropylmethyl cellulose stearoxyether, carboxymethylhydroxyethyl cellulose, alkylhydroxyethyl cellulose, nonoxynylhydroxyethyl cellulose or the like can be exemplified.

As for the anionic cellulose base semisynthetic polymer, alkylcellulose and sodium salts and ammonium salts thereof can be exemplified wherein the above mentioned nonionic cellulose base semisynthetic polymer are substituted by various derivative groups. For example, cellulose sodium sulfate, methyl cellulose, methylethyl cellulose, ethyl cellulose, carboxymethyl cellulose (CMC), salts thereof and the like can be exemplified.

As for the cationic cellulose base semisynthetic polymer, for example, low nitrogen hydroxyethyl cellulose dimethyldiallyl ammonium chloride (Polyquaternium-4), O-chloride [2-hydroxy-3-(trimethylammonio)propyl] hydroxyethyl cellulose (Polyquaternium-10), O-chloride[2-hyrdoxy-3-(lauryldimethylammonio)propyl] hydroxyethyl cellulose (Polyquaternium-24) and the like can be exemplified.

In these, the cellulose base semisynthetic polymers, sodium salts or ammonium salts thereof are preferable particularly, in view of having cationic, anionic or amphoteric properties. In these, the anionic cellulose base semisynthetic polymer is preferable particularly, in view of dispersibility of the inorganic filler.

Also, an etherification degree of the cellulose base semisynthetic polymer is preferably within a range of 0.5 to 1.0, more preferably, within a range of 0.6 to 0.8. The etherification degree means a degree of substitution to carboxymethyl group and the like of hydroxyl group (three) per one anhydroglucose unit in the cellulose. It can be a value from 0 to 3, theoretically. When the etherification degree is within the above mentioned range, there is advantageous dispersibility, because it is adsorbed to the surface of the inorganic filler with compatible solubility to water can be found, and inorganic filler can be finely dispersed to be primary particle level. By having most appropriate average polymerization degree additionally, temporal stability is improved, and it is possible to perform coating process without aggregation to prevent a nonuniformity thickness.

(Inorganic Filler)

It is desired that inorganic filler is stable electro-chemically under using environment of a secondary battery. Also, it is desired that the inorganic filler is a material which is suitable to prepare the slurry mixed with said water soluble polymer and particulate polymer.

It is desirable that BET specific surface area the filler is, for example, $0.9 \text{ m}^2/\text{g}$ or more, further, $1.5 \text{ m}^2/\text{g}$ or more. Also, in view of inhibiting aggregation of the filler and optimizing the fluidity of the slurry, it is desirable that BET specific surface area is not too large, for example, $150 \text{ m}^2/\text{g}$ or less. Also, an average particle diameter (D50 average particle diameter of volume average) of the inorganic filler is 0.1 to 5 μm, further, 0.2 to 2 μm is preferable.

From the above view, as for the inorganic filler, inorganic oxide filler is preferably used, for example, alumina (aluminum oxide), magnesia (magnesium oxide), calcium oxide, titania (titanium oxide), zirconia (zirconium oxide), talc, silica stone and the like are used as materials.

The inorganic fillers like these have advantage dispersion stability and homogenous slurry condition is maintained during long time without precipitation when slurry for porous film is prepared.

(Porous Film)

The porous film of the present embodiment is obtained by coating a slurry (slurry for porous film) composed of the above mentioned water soluble polymer, particulate polymer, inorganic filler and dispersion medium on a predetermined substrate material and drying. Although the substrate material is not particularly limited, the porous film of the present invention is preferably formed on surfaces of a secondary battery electrode and electric double layer capacitor electrode particularly.

Solid component in the obtainable porous film is equal to solid component of slurry for porous film, it contains preferably 0.1 to 5 parts by mass of water soluble polymer, further preferably 0.2 to 4 parts by mass, also contains preferably 0.1 to 15 parts by mass of particulate polymer, further preferably 0.5 to 10 parts by mass per 100 parts by mass of said inorganic filler. When content amounts of the water soluble polymer and the particulate polymer are less than said range, there is a risk for reducing aggregation or porosity, because dispersion property of the inorganic filler is reduced. Further, adhesive properties of the inorganic filler each other and to the electrode are reduced, there is a risk for dropping powder and reducing flexibility. When content amounts of the above mentioned water soluble polymer and the particulate polymer are larger than said range, there is a risk for increasing resistance, because movement of Li is inhibited by covering voids.

Also, in the porous film, dispersion agent and electrolyte solution additive agent and the like preventing degradation of battery electrolyte may be included in addition to the above mentioned water soluble polymer, particulate polymer and inorganic filler. These are not particularly limited if it does not influence to battery reaction.

Because the porous film of the present embodiment has appropriate porosity and absorbs electrolyte solution, and the electrolyte solution penetrates into the film, therefore battery reaction cannot be inhibited if in case that the film is formed on the surface of the secondary battery electrode, and there is no adversely affect to a rate capability and the like as compared with a conventional porosity protection film. Also, because the porous film of the present embodiment has appropriate flexibility, it performs as a protective film of the electrode as formed on the surface of secondary battery electrode, and it contributes to prevent disengagement of active material during manufacturing process of the battery and to prevent short circuit when the battery is operated.

The porous film like this has excellent balance of porosity and flexibility, also high holding property of the inorganic filler, thus, disengagement of the filler during manufacturing process of the battery can be reduced.

A thickness of the porous film is not particularly limited, although it can be set as appropriately in accordance with usage of the film or applying fields, when it is too thin, a uniform film cannot be formed, also when it is too thick, a capacity per volume (weight) in the battery is decreased, therefore 1 to 50 µm is preferred. Further, when it is formed as a protective film on the electrode surface, 1 to 20 µm is preferred.

(Slurry for Porous Film)

The porous film of the present embodiment is formed by coating the slurry for porous film comprising the above mentioned predetermined solid composition on a following mentioned electrode composition material layer of a secondary battery electrode and drying. Also, the porous film can be formed by drying after immersing the electrode to said slurry. Alternatively, a porous film, which is obtained by coating the slurry on a release film, may be transferred on a predetermined electrode composite material layer.

The secondary battery electrode, to which the porous film is formed of the present embodiment is composed of that the porous film is formed on the above mentioned electrode composite material layer. The porous film may be formed on any surfaces of positive electrode and negative electrode of the secondary battery, it can be formed on both positive and negative electrodes.

Although solid content concentration of the slurry for porous film is not particularly limited unless having viscosity and fluidity capable to perform the above coating and immersion, in normally, 20 to 50% by weight and the like. Also, as for a dispersion medium of the slurry for porous film, although it is not particularly limited if the above mentioned solid contents can be dispersed uniformity, in normally, water, acetone, tetrahydrofuran, methylene chloride, chloroform, dimethyl formamide, N-methyl pyrolidone, cyclohexane, xylene, cyclohexanone or mixed solvent thereof are used. Among them, it is preferable to use water particularly. The water soluble polymer dissolves by using water, the slurry wherein particulate polymer and inorganic filler are dispersed uniformity in the solution can be obtained. Also, it is preferable to use water in view of working condition and environment conservation, because organic solvent is not used.

A method for producing slurry for porous film is not particularly limited, it can be obtained by mixing the above mentioned water soluble polymer, particulate polymer and inorganic filler as well as other component to be added in accordance with necessity, and dispersion medium. By using above components, the slurry for porous film in which inorganic filler is highly dispersed can be obtained regardless of mixing method and mixing order. As for other components, nanoparticulate such as fumed silica, alumina and the like; surface active agents such as alkyl type surface active agent, silicone type surface active agent, fluorine type surface active agent, metal type surface active agent and the like are exemplified. By mixing said nanoparticulate, thixotropy of the slurry for forming porous film can be controlled, leveling property of an obtainable porous film can be improved further thereby. By mixing said surface active agent, repellent at coating process can be prevented and smoothness of an electrode can be improved. As a mixing apparatus, it is not particularly limited if the above mentioned components can be mixed uniformly, although a ball mill, a sand mill, a pigment dispersing machine, a grinder, an ultrasonic dispersion machine, a homogenizer, a planetary mixer can be used, in particular, it is preferable to use a high dispersion machine such as a bead mill, a roll mill, Fill mix and the like which is capable to provide high dispersion share.

A method for coating the slurry for porous film on the electrode composite material layer is not particularly limited. For example, the doctor blade method, the dip method, the rivers roll method, the direct roll method, the gravure method, the extrusion method, the brush application method and the like are exemplified. In these, the dip method and gravure method are preferable in view of that a uniform porous film can be obtained. As for the drying method, for example, drying by warm air, hot air, low humid air, vacuum drying, drying methods by irradiating (far)infrared radiation, electron beam and the like are exemplified. The drying temperature is changed according to a kind of used solvent. For example, for removing the solvent completely, in case of using solvent having low volatility such as N-methylpyrrolidone and the like, it is preferable to dry by a blow dryer at high temperature more than 120° C. Contrary to this, in case of using solvent having high volatility, it can be dried at a low temperature lower than 100° C.

Next, adhesion of the electrode composite material layer and the porous film can be improved by pressure treatment with using mold press, roll press and the like. However, in this case, if the pressure treatment is excessively performed, there is a risk to deteriorate the porosity of the porous film, therefore, a pressure force and pressing time shall be controlled appropriately.

The porous film of the present embodiment is formed on a surface of a secondary battery electrode, and is preferably used as a protective film for an electrode composite material layer or as a separator which is particularly preferable. The secondary battery electrode, to which the porous film is formed, is not particularly limited, the porous film of the invention can be formed on electrodes having various kind of configuration. Also, the porous film may be formed on any surfaces of positive electrode and negative electrode of the secondary battery, also it can be formed on both positive and negative electrodes. Further, the porous film is used as a protective film for an electrode of electric double layer capacitor too.

(Electrode)

The secondary battery electrode and the electrode of electric double layer capacitor are generally composed of electrode composite material layer formed by slurry comprising a binder and an electrode active material (hereinafter sometimes referred as "composite material slurry") is adhered to a collector.

For the electrode active material for secondary battery, any compounds can be used if it is available to charge and discharge lithium ion reversibly by applying electric potential in electrolyte, and inorganic and organic compounds may be used.

An active material for positive electrode (positive electrode active material) for the secondary battery electrode is classified into two broad categories, namely of inorganic compound and organic compound. As for the positive electrode active material, transition metal oxide, complex oxide of lithium and transition metal, transition metal sulphide and the like are exemplified. As for the above mentioned transition metal, Fe, Co, Ni, Mn and the like are used. As specific examples of the inorganic compound used for the positive electrode active material, lithium containing complex metal oxide such as $LiCoO_2$, $LiNiO_2$, $LiMnO_2$, $LiMn_2O_4$, $LiFePO_4$, $LiFeVO_4$ and the like, transition metal sulphide such as $TiS_2$, $TiS_3$, amorphous $MoS_2$ and the like, transition metal oxide such as $Cu_2V_2O_3$, amorphous $V_2O$—$P_2O_5$, $MoO_3$, $V_2O_5$, $V_6O_{13}$ and the like are exemplified. These compounds may be subjected to elemental substitution partially. As for the positive electrode active material composed of the organic compound, for example, such conductive polymer as polyacetylene, poly-p-phenylene and the like can be used. Ferrous oxide which has poor electric conductivity, but it may be used as an electrode active material covered with a carbon material by existing a carbon source when reduction firing. Also, these compounds may be subjected to elemental substitution partially.

The positive electrode active material for the secondary battery may be a mixture of the above mentioned inorganic compounds and organic compounds. Although a particle diameter of the positive electrode active material is suitably selected in view of balance with other constitutional element of the battery, 50% accumulated volume diameter is normally 0.1 to 50 μm, preferably 1 to 20 μm, in view of improving battery property, such as a load characteristic and cycling characteristic. When the 50% accumulated volume diameter is within this range, a secondary battery having large discharge and charge amount, and it is easy for handling when producing the slurry for electrode and coating the slurry to form electrode. The 50% accumulated volume diameter can be determined by measuring particle size distribution with laser diffraction.

As for an electrode active material for a negative electrode (negative electrode active material) for the secondary battery, carbonaceous materials such as, amorphous carbon, graphite, natural graphite, meso carbon micro beads, pitch base carbon fiber and the like, conductive polymer such as polyacene and the like can be exemplified. Also, as for the negative electrode active material, metals such as silicon, tin, zinc, manganese, iron, nickel, and alloys thereof, oxides, sulfates of said metals or alloys thereof are used. Additionally, metallic lithium, lithium alloy such as Li—Al, Li—Bi—Cd, Li—Sn—Cd and the like, lithium transitional metal nitrides, silicon and the like can be used. An electrode active material on which conductivity improver is adhered by a mechanical modifying method can be used too. Although a particle diameter of the negative electrode active material is suitably selected in view of balance with other constitutional element of the battery, 50% accumulated volume diameter is normally 1 to 50 μm, preferably 15 to 30 μm, in view of improving battery characteristic, such as initial efficiency, a load characteristic and cycling characteristic.

As for the electrode active material for electric double layer capacitor, powder or fiber of carbonaceous material such as activated carbon, polyacene, carbon whisker, graphite and the like can be used. The electrode active material is preferably the activated carbon, and as for the activated carbon, phenol type, rayon type, acryl type, pitch type, palm shell type and the like can be used. A specific surface area of the activated carbon is normally 500 to 5,000 $m^2/g$, preferably, 1,000 to 3,000 $m^2/g$. Also, nonporous carbon comprising microcrystal carbon which is similar with graphite, and has enlarged interlayer distance of the microcrystal carbon disclosed in Japan Patent Laid Open Nos. H11-317333 and 2002-25867 and the like can be used as electrode active material. Surface specific area of the nonporous carbon is normally 10 to 1,000 $m^2/g$, preferably 130 to 300 $m^2/g$. When the particle size of the electrode active material is 0.1 to 100 μm, further preferably 1 to 20 μm, an electrode for capacitor can be made as thin film easily and a specific capacity can be higher which is preferable. Further, in a redox capacitor, metal oxide such as ruthenium oxide ($RuO_2$) and the like can be used as electrode active material.

The conductivity improver may be added to composite material slurry, in addition, to be adhered to said electrode active material. As for the conductivity improver, conductive carbon such as, acetylene black, ketchen black, carbon black, graphite, vapor phase growth carbon fiber, carbon nanotube and the like can be used. Carbon powder such as graphite, fiber and foil of various metals are also exemplified. As for reinforcement material, various organic and inorganic spherical type, plate type, rod type and fiber type filler can be used. By using the conductivity improver, electric contact of each electrode active materials can be improved which contribute to improve discharge rate capability when used to a lithium ion secondary battery, to reduce an internal resistance when using an electric double layer capacitor, and capacity density can be increased. Amount of the conductivity improver is normally 0 to 20 parts by mass, preferably 1 to 10 parts by mass per 100 parts by mass of the electrode active material.

The electrode composite material layer includes binder and electrode active agent. In normally, the composite material is prepared as composite slurry dispersed in solvent. As for the solvent, those capable dissolving or finely dispersing the binder can be used, and the solvent which can dissolve the binder is preferable. When the solvent which can dissolve the binder is used, the electrode active material disperse stably by adhering the surface thereof with the binder.

As for the binder, various resin components can be used. For example, polyethylene, polytetrafluoroethylene (PTFE), polyvinylidene fluoride (PVDF), tetrafluoroethylene-hexafluoropropylene copolymer (FEP), polyacrylic acid derivative, polyacrylonitrile derivative and the like can be used. They can be used as alone or may be mixed two kinds or more.

Further, soft polymer exemplified below can be used as binder.

Acrylic type soft polymer, which is homopolymer of acrylic acid or methacrylic acid derivatives or copolymer with monomer copolymerizable therewith, such as polybutylacrylate, polybutylmethacrylate, polyhydroxyethyl methacrylate, polyacrylamide, polyacrylonitrile, butylacrylate/styrene copolymer, butylacrylate/acrylonitrile copolymer, butylacrylate/acrylonitrile/glycidylmethacrylate copolymer and the like;

Isobutylene type soft polymer such as polyisobutylene, isobutylene/isoprene rubber, isobutylene/styrene copolymer and the like;

Diene type soft polymer, such as polybutadiene, polyisoprene, butadiene/styrene random copolymer, isoprene/styrene random copolymer, acrylonitrile/butadiene copolymer, acrylonitrile/butadiene/styrene copolymer, styrene/butadiene/styrene block copolymer, butadiene/styrene block copolymer, isoprene/styrene block copolymer, styrene/isoprene/styrene block copolymer and the like;

Silicon containing soft copolymer such as dimethyl polysiloxane, diphenyl polysiloxane, dihydroxy polysiloxane and the like;

Olefinic soft polymer such as liquid polyethylene, polypropylene, poly-1-butene, ethylene/α-olefin copolymer, propylene/α-olefin copolymer, ethylene/propylene/diene copolymer (EPDM), ethylene/propylene/styrene copolymer and the like;

Vinyl type soft polymer such as polyvinyl alcohol, polyvinyl acetate, polyvinyl stearate, vinyl acetate/styrene copolymer and the like;

Epoxy type soft polymer such as polyethylene oxide, polypropylene oxide, epichlorohydrin rubber and the like;

Fluorine containing soft polymer such as vinylidene fluoride rubber, polytetra-fluoroethylene-propylene rubber and the like;

Other soft polymer such as natural rubber, polypeptide, protein, polyester type thermoplastic elastomer, vinyl chloride type thermoplastic elastomer, polyamide type thermoplastic elastomer and the like are exemplified. These soft polymers may contain crosslinking structure, and functional groups may be added by modification.

Amount of the binder, when used for the lithium ion secondary battery, is preferably 0.1 to 5 parts by mass, more preferably 0.2 to 4 parts by mass, particularly preferably 0.5 to 3 parts by mass per 100 parts by mass of the electrode active material. Also, when used for the electric double layer capacitor, it is preferably 0.1 to 20 parts by mass, more preferably 0.5 to 10 parts by mass per 100 parts by mass of the electrode active material. When the amount of binder is too little, there is a risk to disengage the active material from the electrode easily, to the contrary, when it is too much, there are risks to inhibit battery reaction and to increase an internal resistance, because the active material is covered and hidden by the binder.

The binder is prepared as solution or dispersion liquid for producing the electrode. Viscosity at this time is normally in a range of 1 mPa·S to 300,000 mPa·S, preferably 50 mPa·S to 10,000 mPa·S. Said viscosity is a value when it is measured at 25° C. and rotation speed 60 rpm by using B type viscometer.

Normally, the composite material slurry contains solvent to disperse the electrode active material and conductivity improver. As for the solvent, it is preferable to use solvent which is capable to dissolve said binder, because it has excellent dispersibility for the electrode active material and conductivity improver. It is expected that, the binder is adhered on a surface of the electrode active material and the like to thereby stabilizing the dispersion by its volume effect when using the binder dissolved in the solvent.

As for the solvent used for the composite material slurry, either water or organic solvent can be used. As for the organic solvent, cycloaliphatic hydrocarbons, such as cyclopentane, cyclohexane and the like; aromatic hydrocarbons such as toluene, xylene and the like, ketones such as ethyl methyl ketone, cyclohexane and the like, esters such as ethylacetate, butylacetate, γ-butyrolactone, ε-caprolactone and the like; acylonitriles such as acetonitrile, propionitrile and the like; ethers such as tetrahydrofuran, ethyleneglycoldiethylether and the like; alcohols such as methanol, ethanol, isopropanol, ethylene glycol, ethyleneglycolmonomethylether and the like; amides such as N-methylpyrrolidone, N,N-dimethyl formamide and the like are exemplified. These solvents can be used suitably selected in view of drying speed and environment by single or mixing two kinds or more. In the present embodiment, it is preferable to use nonaqueous solvent, in view of swelling characteristic of the electrode to water.

Additives such as viscosity improver, conductive material, reinforcing material can be added to the composite material slurry by which various functions can be realized. As for the viscosity improver, the organic solvent soluble polymer is used, wherein the organic solvent is that used for the composite material slurry. Specifically, acrylonitrile-butadiene copolymer and the like are used.

Further, trifluoropropylene carbonate, vinylene carbonate, catechol carbonate, 1,6-dioxaspiro[4,4]nonane-2,7-dione, 12-crown-4-ether and the like can be used for the composite material slurry, in order to improve stability and life duration of the battery. Also, these can be used as included in the following mentioned electrolyte solution.

Amount of the organic solvent in the composite material slurry is adjusted so as to be an appropriate viscosity for coating in accordance with kinds of the electrode active material and binder and the like. Specifically, the concentration of solid content mixed by the electrode active material, binder and other additives are adjusted at, preferably 30 to 90 mass %, further preferably 40 to 80 mass %.

The composite material slurry is obtained by mixing the binder, electrode active material, additive agents to be added in accordance with necessity and other organic solvent with using a blender. As for the blending, although the above mentioned respective components can be supplied into the blender together, such method that the conductive material and viscosity improver are mixed in the organic solvent so as to disperse the conductive material finely, then the binder and the electrode active materials are added and mixed further is preferable, because the dispersibility of the slurry is improved. As for the mixing machine, although a ball mill, sand mill, a pigment dispersing machine, a grinder, an ultrasonic dispersion machine, a homogenizer, a planetary mixer and Hobart mixer can be used, the ball mill is preferred because aggregation of the conductive material and the electrode active material can be prevented.

Granularity of the composite material slurry is preferably 35 μm or less, further preferably 25 μm or less. When the granularity of the slurry is within the above mentioned range, uniform electrode having high dispersibility of the conductive material can be obtained.

Although a collector is not particularly limited if it has electric conductivity and electrochemical durability, in view of having heat resistance, for example, metallic material such as Fe, Cu, Al, Ni, Stainless steel, Ti, Ta, Au, Pt and the like are preferable. In particular, Al is preferable for a positive electrode of nonaqueous electrolyte secondary battery, and Cu is particularly preferable for a negative electrode. Although a shape of the collector is not particularly limited, a sheet having about 0.001 to 0.5 mm thickness is preferable. The collector is preferably subjected to surface roughening treatment in advance, for improving binding strength to the composite material. As for a method for roughening surface, mechanical polishing, electropolishing, chemical polishing and the like are exemplified. In the mechanical polishing, a coated abrasive in which abrasive particles are adhered, a grind stone, an emery wheel, a wire brush provided with steel wire and the like are used. Also, in order to improve bonding strength and conductivity of the electrode composite material layer, an intermediate layer may be formed on a surface of the collector.

A method for manufacturing the secondary battery electrode may be any methods which can adhere the electrode composite material layer in the form of laminae on at least one surface, preferably on both surfaces of the collector. For example, said composite material slurry is coated on the collector and is dried, next, heat treated more than one hour at 120° C. or more so as to form the composite material electrode layer. A method for coating the composite material slurry to the collector is not limited. For example, a doctor blade method, a dip method, a reverse roll method, a direct roll method, a gravure method, an extrusion method, a brush application method and the like are exemplified. As for the drying method, for example, drying by warm air, hot air, low humid air, vacuum drying, drying methods by irradiating (far) infrared radiation, electron beam and the like are exemplified.

Next, a porosity of the composite material electrode is preferably lowered by pressure treatment with using mold press, roll press and the like. A preferable range of the porosity is 5% to 15%, further preferably 7% to 13%. When the porosity is too high, charging efficiency and discharge efficiency are deteriorated. When the porosity is too low, problems that it is hard to obtain a high volume capacity, defect due to easily peeling the composite material are occurred. Further, when using curable polymer, it is preferable to perform curing.

A thickness of the electrode composite material layer is in normally 5 to 300 μm for both positive and negative electrodes, preferably 10 to 250 μm.

The secondary battery electrode provided with a porous film of the present invention is used as an electrode for a secondary battery such as a lithium ion secondary battery and an electric double layer capacitor. In particular, it is preferable to be used as an electrode for the lithium ion secondary battery.

The lithium ion secondary battery of the present embodiment includes a positive electrode, a negative electrode and electrolyte solution, wherein at least one of the positive and negative electrodes is the secondary battery electrode provided with porous film of the present embodiment.

An example of the secondary battery electrode provided with porous film of the present embodiment used to the positive electrode and negative electrode will be specified. As for a specific manufacturing method for the lithium ion secondary battery, for example, a method wherein positive electrode provided with a porous film and a negative electrode provided with a porous film are overlapped via a separator, and the resulting laminate is inputted to a battery container by rolling or folding in accordance with a battery shape, filling electrolyte solution to the battery container and sealing is exemplified. Also, it is possible to prevent pressure rising of internal battery, over charge and discharge by inputting over-current protective elements such as expand metal, fuse, PTC elements and the like, a lead plate and the like, in accordance with necessity. A shape of the battery may be any of a coin type, a button type, a sheet type, a cylindrical type, a square type, a flat type and the like.

As for the above mentioned separator, a conventionally known separator composed of polyolefin resin such as polyethylene, polypropylene and the like are used. Note that, because the porous film of the present embodiment has a separator function too, it is possible to omit using a separator.

As for the electrolyte solution, an organic electrolyte solution wherein supporting electrolyte is solved in the organic solvent is used. As for the supporting electrolyte, lithium salt is used. As for the lithium salt, although there is no limitation particularly, $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)NLi$ are exemplified. In particular, $LiPF_6$, $LiClO_4$, $CF_3SO_3Li$ which are easily soluble to solvent and show high dissociation degree are preferred. They may be used as combination of two kinds or more. Because the supporting electrolyte having high dissociation degree is used, the lithium ion conductivity becomes higher, hence the lithium ion conductivity can be controlled by a kind of supporting electrolyte.

Although the organic solvent used for the electrolyte is not particularly limited if it is possible to dissolve the supporting electrolyte, carbonates such as dimethyl carbonate (DMC), ethylene carbonate (EC), diethyl carbonate (DEC), propylene carbonate (PC), butylene carbonate (BC), methylethyl carbonate (MEC) and the like; esters such as γ-butyrolactone, methyl formate and the like; ethers such as 1,2-dimethoxyethane, tetrahydrofuran and the like; sulfur-containing compounds such as sulfolane, dimethyl sulfoxide and the like are used preferably. Also, mixture liquids of these solvent may be used. In particular, carbonates are preferable, since they have high conductivity and wide stable potential area. When the viscosity of the used solvent is low, the lithium ion conductivity becomes higher, hence the lithium ion conductivity can be controlled by a kind of the solvent.

Concentration of the supporting electrolyte in the electrolyte solution is normally 1 to 30 mass %, preferably 5 mass % to 20 mass %. Also, in accordance with kinds of the supporting electrolyte, it is used at concentration of 0.5 to 2.5 mol/L normally. When either the concentration of the supporting electrolyte is too low or too high, the ion conductivity tends to be decreased. When the concentration of the used electrolyte is low, a swelling degree of the polymer particle becomes larger, hence the lithium ion conductivity can be controlled by a concentration of the electrolyte solution.

EXAMPLE

Below, although the present invention will be explained with showing an example, the present invention is not limited thereto. Note that, part and % in this example are by mass unless otherwise indicated.

In examples and comparative examples, various physical properties are evaluated as follows.

(Evaluation Method)
<1. Porous Film Electrode Property>
<1.1 Powder Disengagement Property>
An electrode provided with a porous film was cut to be 5 cm square and was put into 500 ml of a glass bottle and reciprocally shaking during 2 hrs at 200 rpm by a reciprocal shaker.

When disengaged powder mass is defined as "a", an electrode mass before shaking is defined as "b", an electrode mass before applying a porous film is defined as "c", disengaged powder mass at the time of reciprocally shaking an electrode without applying a porous film is defined as "d", a proportional ratio X of the disengaged powder was calculated as follows, and evaluated by following criteria.

$$X=(a-d)/(b-c-a)\times100 \text{ (mass \%)}$$

(Evaluation Criteria)
A: less than 2%
B: 2% or more to less than 5%
C: 5% or more to less than 10%
D: 10% or more <1.2 Film Uniformity>

An electrode provided with porous film was cut to be 6 cm width×1 m length, in the cutout electrode, thicknesses were measured at three points in the width direction and every 5 cm of the length direction, from a standard deviation and an average value of a film thickness, standard variations were calculated based on a following formula and was evaluated by following criteria.

$$\text{film thickness standard deviation } \sigma = \sqrt{\frac{n\sum x^2 - (\sum x)^2}{n^2}} \quad \text{[formula 1]}$$

$$\text{standard variations of film thickness } \sigma/x \times 100(\%)$$

Here, x shows average value of film thickness, n shows number of measurement.
(Evaluation Criteria)
A: less than 5%
B: 5% or more to less than 10%
C: 10% or more to less than 20%
D: 20% or more to less than 50%
E: 50% or more <2. Battery Property>
<2.1 Discharge and Charge Cyclic Property>

By using an obtained coin type battery, charge and discharge cycle including charging to 0.02V by 0.2 C of constant current at 20° C., and discharging until 1.5V by 0.2 C of constant current was performed. The discharge and charge cyclic property is defined in accordance with calculating the percent of a discharge capacity at one hundred cycles to a discharge capacity at second cycles, and was determined by following criteria. When this value is smaller, capacity decreasing is larger and life duration is short.
(Evaluation Criteria)
A: 90% or more
B: 85% or more to less than 90%
C: 80% or more to less than 85%
D: 80% or less For slurry for forming a protective film (porous film) in examples and comparative examples, following components were used.
<Water Soluble Polymer>

Carboxymethyl cellulose of average polymerization degree 1200 to 1300, etherification degree 0.65 to 0.75 was used as water soluble polymer.
<Particulate Polymer>
(Preparation of Particulate Polymer "A")

70 parts of ion exchange water, 0.2 parts of sodium dodecylbenzenesulfonate, 0.3 parts of potassium persulfate were respectively supplied to a reactor equipped with an agitator, gas phase portion was substituted by nitrogen gas, and temperature was raised to 60° C. On the other hand, monomer mixture was obtained by blending 50 parts of ion exchange water, 0.5 parts of sodium dodecylbenzenesulfonate, and as for polymerizable monomers, 80 parts of ethylacrylate (acrylic acid ethyl), 15 parts of acrylonitrile, 5 parts of itaconic acid. Polymerization was made by continuously adding the monomer mixture to said reactor for 4 hrs. During addition, reaction was performed at 60° C. After finishing the addition, further stirring for 3 hrs at 70° C. was continued, and then reaction was terminated. A polymerization conversion rate was 99.5% or more. After cooling the obtained polymerization reaction liquid to 25° C., and was adjusted to pH of 7 by adding aqueous ammonia, then non reacted monomers ware removed by inducing steam and 40% water dispersion of particulate polymer "A" was obtained. The obtained particulate polymer "A" includes 5% monomer (itaconic acid) unit comprising hydrophilic group, glass transition temperature was 10° C. and an average particle diameter was 100 nm.

(Preparation of Particulate Polymer "B")

Except for changing itaconic acid in the particulate polymer "A" to acrylic acid, polymerization was performed as similar with the particulate polymer "A" and 40% water dispersion of particulate polymer "B" was obtained. The obtained particulate polymer "B" includes 5% monomer (acrylic acid) unit comprising hydrophilic group, glass transition temperature was 5° C. and an average particle diameter was 100 nm.

(Preparation of Particulate Polymer "C")

Except for changing itaconic acid in the particulate polymer "A" to acrylamide-2-methylpropane sulfonic acid, polymerization was performed as similar with the particulate polymer "A" and 40% water dispersion of particulate polymer "C" was obtained. The obtained particulate polymer "C" includes 5% monomer (acrylamide-2-methylpropane sulfonate) unit comprising hydrophilic group, glass transition temperature was 3° C. and an average particle diameter was 100 nm.

(Preparation of Particulate Polymer "D")

Except for changing itaconic acid in the particulate polymer "A" to 2-hydroxyethyl methacrylate (methacrylic acid 2-hydroxyethyl), polymerization was performed as similar with the particulate polymer "A" and 40% water dispersion of particulate polymer "D" was obtained. The obtained particulate polymer "D" includes 5% monomer (2-hydroxyethyl methacrylate) unit comprising hydrophilic group, glass transition temperature was 3° C. and an average particle diameter was 100 nm.

(Preparation of Particulate Polymer "E")

Except for changing 5 parts of itaconic acid in the particulate polymer "A" to 2 parts, polymerization was performed as similar with the particulate polymer "A" and 40% water dispersion of particulate polymer "E" was obtained. The obtained particulate polymer "E" includes 2% monomer (itaconic acid) unit comprising hydrophilic group, glass transition temperature was 0° C. and an average particle diameter was 100 nm.

(Preparation of Particulate Polymer "F")

Except for changing 5 parts of itaconic acid in the particulate polymer "A" to 0.1 parts, polymerization was performed as similar with the particulate polymer "A" and 40% water dispersion of particulate polymer "F" was obtained. The obtained particulate polymer "F" includes 0.1% monomer (itaconic acid) unit comprising hydrophilic group, glass transition temperature was −5° C. and an average particle diameter was 100 nm.

(Preparation of Soluble Polymer "G")

300 parts of ion exchange water, 80 parts of 2-ethylhexyl acrylate (acrylic acid 2-ethylhexyl), 15 parts of acrylonitrile, 3 parts of methacrylic acid, 2 parts of glycidylmethacrylate, 3 parts of sodium dodecylbenzene sulfonate and 0.7 parts of potassium persulfate were added into an autoclave equipped with an agitator, polymerized with heated to 70° C. after agitation sufficiently so that particulate polymer was obtained. A polymerization conversion rate measured from solid content concentration was 99%. 320 parts of NMP was added to 100 parts of the particulate polymer, NMP solution of soluble polymer "G" was prepared by distilling water under reduced pressure.

<Inorganic Filler>

For inorganic filler, alumina having an average particle size of 0.5 μm was used.

Example 1

<Manufacturing Slurry for Porous Film>

Inorganic filler, water soluble polymer and particulate polymer were blended so that a solid content mass ratio becomes 100:4:5 respectively, and slurry "1" for porous film was prepared by dispersing in water with using a bead mill. Note that, the particulate polymer "A" was used as particulate polymer. Also, content amount of raw materials in the slurry other than water (total sum of solid content) was set to be 50 mass %.

(Manufacturing Electrode Composition for Positive Electrode and Manufacturing Positive Electrode)

As binder, 3 parts, in terms of solid content, of PVDF (polyvinylidene fluoride) was added into 95 parts of $LiCoO_2$ having spinel structure as a positive electrode active material, further, 2 parts of acetylene black, 20 parts of N-methyl pyrolidone were added and blended by a planetary mixer, slurry type electrode composition for a positive electrode was obtained. The electrode composition was applied to an aluminium foil having 18 μm thickness, dried after 3 hrs at 120° C., was roll pressed to thereby obtained a positive electrode having 100 μm thickness.

<Manufacturing Electrode Composition for Negative Electrode and Manufacturing Negative Electrode>

98 parts of graphite having particle size of 20 μm, 4.2 $m^2/g$ of specific surface area as a negative electrode active material, 5 parts in terms of solid content, of PVDF (polyvinylidene fluoride) as binder were blended, further, NMP was added and blended by a planetary mixer so that slurry type electrode composition for a negative electrode was prepared. The negative electrode composition was coated on one surface of a copper foil having 0.1 μm thickness, dried after 3 hrs at 110° C., was roll-pressed to thereby obtained a negative electrode having 100 μm thickness.

<Producing Electrode Provided with Porous Film>

Said slurry "1" for porous film is coated to a surface of negative electrode so that a negative electrode composite material layer is covered completely and a thickness after drying becomes 10 μm, and dried for 20 min at 110° C. to form the porous film, thereby a secondary battery electrode provided with porous film was obtained. Powder disengagement property and film uniformity of the obtained electrode provided with a porous film were evaluated. Results are shown in Table 1.

(Producing Secondary Battery)

The obtained positive electrode was cut to be a circular shape having 13 mm diameter, the obtained negative electrode was cut to be a circular shape having 14 mm diameter. A separator composed of a circular shape polypropylene having 18 mm diameter and 25 μm thickness, the negative electrode were sequentially laminated on a surface wherein active material layer side of the positive electrode, and was inserted into a coin type external container made of stainless steel provided with a packing made of polypropylene. Electrolyte solution (EC/DEC=½, 1M of $LiPF_6$) was injected into the container without residual air, fixed by a cap made of stainless steel having 0.2 mm thickness via the polypropylene packing to seal a battery case, thereby a lithium ion secondary battery having 20 mm diameter and about 3.2 mm thickness was produced (coin cell CR2032). Discharge and charge cyclic property of the obtained battery was measured. Results thereof are shown in Table 1.

TABLE 1

| | polymer type | powder disengagement property | film uniformity | cyclic property |
|---|---|---|---|---|
| Example 1 | particulate A | A | A | A |
| Example 2 | particulate A | A | A | B |
| Example 3 | particulate B | B | B | A |
| Example 4 | particulate C | B | C | A |
| Example 5 | particulate D | B | C | A |
| Example 6 | particulate E | B | B | B |
| Comparative Example 1 | — | D | E | C |
| Comparative Example 2 | particulate F | C | C | B |
| Comparative Example 3 | soluble type G | B | B | D |
| Comparative Example 4 | PVDF | C | C | E |

Example 2

In the example 1, except for coating slurry for porous film on a positive electrode and using a negative electrode wherein a porous film was not coated, an electrode provided with a porous film and a secondary battery were manufactured as similar with the example 1 and evaluated thereof. Results are shown in Table 1.

Example 3

In the example 1, except for changing the particulate polymer "A" to the particulate polymer "B", slurry "3" for porous film was prepared as similar with the example 1. In the example 1, except for changing the slurry "1" for porous film to slurry "3" for porous film, an electrode provided with a porous film and a secondary battery were manufactured as similar with the example 1 and evaluated thereof. Results are shown in Table 1.

Example 4

In the example 1, except for changing the particulate polymer "A" to the particulate polymer "C", slurry "4" for porous film was prepared as similar with the example 1. In the example 1, except for changing the slurry "1" for porous film to slurry "4" for porous film, an electrode provided with a porous film and a secondary battery were manufactured as similar with the example 1 and evaluated thereof. Results are shown in Table 1.

Example 5

In the example 1, except for changing the particulate polymer "A" to the particulate polymer "D", slurry "5" for porous film was prepared as similar with the example 1. In the example 1, except for changing the slurry "1" for porous film to slurry "5" for porous film, an electrode provided with a porous film and a secondary battery were manufactured as similar with the example 1 and evaluated thereof. Results are shown in Table 1.

Example 6

In the example 1, except for the particulate polymer "A" was changed to the particulate polymer "E" and inorganic filler, water soluble polymer and particulate polymer was blended so that a solid content mass ratio thereof becomes 100:4:2 respectively, slurry "6" for porous film was prepared as similar with the example 1. In the example 1, except for changing the slurry "1" for porous film to slurry "6" for porous film, an electrode provided with a porous film and a secondary battery were manufactured as similar with the example 1 and evaluated thereof. Results are shown in Table 1.

Comparative Example 1

In the example 1, except for not using the particulate polymer "A", slurry "7" for porous film was prepared as similar with Example 1. In the example 1, except for changing the slurry "1" for porous film to slurry "7" for porous film, an electrode provided with a porous film and a secondary battery were manufactured as similar with example 1 and evaluated thereof. Results are shown in Table 1.

Comparative Example 2

In the example 1, except for changing the particulate polymer "A" to particulate polymer "F", slurry "8" for porous film was prepared as similar with Example 1. In the example 1, except for changing the slurry "1" for porous film to slurry "8" for porous film, an electrode provided with a porous film and a secondary battery were manufactured as similar with example 1 and evaluated thereof. Results are shown in Table 1.

Comparative Example 3

In the example 1, except for changing the particulate polymer "A" to the liquid polymer "G" and blending inorganic filler, water soluble polymer and liquid polymer so that a solid content mass ratio thereof becomes 100:4:0.1 respectively, slurry "9" for porous film was prepared as similar with the example 1. Results are shown in Table 1. In the example 1, except for changing the slurry "1" for porous film to slurry "9" for porous film, an electrode provided with a porous film and a secondary battery were manufactured as similar with the example 1 and evaluated thereof. Results are shown in Table 1.

Comparative Example 4

Slurry "10" for porous film was prepared by blending inorganic filler and polyvinylidene fluoride (PVDF) so that solid content mass ratio thereof becomes 100:10, and dispersed in N-methyl pyrolidone (NMP) by using a bead mill. Also, a content amount of raw materials (sum of solid contents) in the slurry was adjusted to be 40 mass %.

In the example 1, except for changing the slurry "1" for porous film to the slurry "10" for porous film, an electrode provided with a porous film and a secondary battery were manufactured as similar with the example 1 and evaluated thereof. Results are shown in Table 1.

As mentioned above, binding property and dispersibility of the inorganic are improved by containing specific amount of specific hydrophilic group in water insoluble particulate polymer, and uniform porous film can be obtained thereby. As a result, a secondary battery produced by using the obtained porous film shows excellent battery characteristic (cycle characteristic).

The invention claimed is:

1. A lithium ion secondary battery comprising; a positive electrode, a negative electrode, and an electrolyte solution, wherein at least one of the positive electrode and the negative electrode comprises:

an electrode composite material layer including a binder and an electrode active material,
a collector to which the electrode composite material layer is adhered, and
a porous film provided on a surface of the electrode composite material layer, wherein the porous film is composed of a mixture comprising;
a water soluble polymer,
an inorganic filler, and
a water insoluble particulate polymer comprising 0.5 to 40 mass % of a monomer unit including a hydrophilic group selected from the group consisting of carboxylic acid group, hydroxyl group and sulfonic acid group,
a content ratio of said water soluble polymer in said porous film is 0.1 to 5 parts by mass per 100 parts by mass of said inorganic filler,
the water soluble polymer is a thickening polysaccharide selected from the group consisting of cellulose base semisynthetic polymers having an etherification degree within a range of 0.5 to 1.0, sodium salts, and ammonium salts thereof, and has an average polymerization degree within a range of 500 to 2500,
a content ratio of the water insoluble particulate polymer is 0.1 to 15 parts by mass per 100 parts by mass of the inorganic filler, and
said electrolyte solution is an organic electrolyte solution wherein a supporting electrolyte is dissolved in an organic solvent.

2. The lithium ion secondary battery as set forth in claim 1, wherein the hydrophilic group of said particulate polymer is a carboxylic acid group.

3. The lithium ion secondary battery as set forth in claim 1, wherein said porous film is obtained by coating a slurry composed of said water soluble polymer, said particulate polymer, said inorganic filler and dispersion medium and drying said slurry.

4. The lithium ion secondary battery as set forth in claim 3, wherein said dispersion medium is water.

5. The lithium ion secondary battery as set forth in claim 1, wherein a separator is provided between the positive electrode and the negative electrode.

6. The lithium ion secondary battery as set forth in claim 1, wherein said monomer unit including hydrophilic group is dicarboxylic acid.

7. The lithium ion secondary battery as set forth in claim 1, wherein said water insoluble particulate polymer comprises 3 to 20 mass % of monomer unit including hydrophilic group selected from the group consisting of carboxylic acid group, hydroxyl group and sulfonic acid group.

8. The lithium ion secondary battery as set forth in claim 1, wherein the content ratio of said water soluble polymer in said porous film is 0.2 to 4 parts by mass per 100 parts by mass of said inorganic filler, and the content ratio of water insoluble particulate polymer is 0.5 to 10 parts by mass per 100 parts by mass of the inorganic filler.

9. The lithium ion secondary battery as set forth in claim 1, wherein said inorganic filler is inorganic oxide filler.

10. The lithium ion secondary battery as set forth in claim 1, wherein the porous film has a thickness of 1 to 20 μm.

11. The lithium ion secondary battery as set forth in claim 1, wherein the porous film is provided on a surface of the negative electrode composite material layer.

12. The lithium ion secondary battery as set forth in claim 1, wherein the porous film is provided on a surface of the positive electrode composite material layer.

13. The lithium ion secondary battery as set forth in claim 1, wherein the water insoluble particulate polymer is a copolymer containing (meth)acrylic acid ester as a monomer unit.

14. The lithium ion secondary battery as set forth in claim 13, wherein the (meth)acrylic acid ester is ethylacrylate.

15. The lithium ion secondary battery as set forth in claim 1, wherein the average polymerization degree of said water soluble polymer is within a range of 1000 to 2000.

16. The lithium n secondary battery as set forth in claim 1, wherein the average polymerization degree of said water soluble polymer is within a range of 1000 to 1500.

17. A method for manufacturing the lithium ion secondary battery as set forth in claim 1 comprising;
   coating and drying slurry for porous film comprising water soluble polymer, inorganic filler, water insoluble particulate polymer including 0.5 to 40 mass % of monomer unit comprising hydrophilic group selected from the group consisting of carboxylic acid group, hydroxyl group and sulfonic acid group, and dispersion medium on an electrode composite material layer comprising a binder and an electrode active material.

18. The method for manufacturing the lithium ion secondary battery as set forth in claim 17, wherein said dispersion medium is water.

* * * * *